United States Patent
Karlsson et al.

(10) Patent No.: US 8,184,596 B2
(45) Date of Patent: May 22, 2012

(54) RESOURCE ALLOCATION AND NETWORK SHARING BETWEEN A MULTIPLE OF 3G-SERVICE PROVIDERS

(75) Inventors: Peter Karlsson, Lund (SE); Rickard Ljung, Helsingborg (SE)

(73) Assignee: Teliasonera AB, Stockholm (SE)

( * ) Notice: Subject to any disclaimer, the term of this patent is extended or adjusted under 35 U.S.C. 154(b) by 927 days.

(21) Appl. No.: 11/666,549

(22) PCT Filed: Oct. 25, 2005

(86) PCT No.: PCT/SE2005/001599
§ 371 (c)(1),
(2), (4) Date: Oct. 9, 2007

(87) PCT Pub. No.: WO2006/049557
PCT Pub. Date: May 11, 2006

(65) Prior Publication Data
US 2008/0043679 A1 Feb. 21, 2008

(30) Foreign Application Priority Data
Nov. 4, 2004 (SE) ........................................ 0402697

(51) Int. Cl.
*H04B 7/216* (2006.01)
(52) U.S. Cl. ..................................... 370/335; 455/432.1
(58) Field of Classification Search .................. 370/320, 370/342, 331; 455/443
See application file for complete search history.

(56) References Cited

U.S. PATENT DOCUMENTS

| | | | |
|---|---|---|---|
| 5,400,328 A | 3/1995 | Burren et al. | |
| 5,566,168 A | 10/1996 | Dent | |
| 6,393,003 B1 * | 5/2002 | Lee | 370/331 |
| 6,504,832 B1 * | 1/2003 | Koo et al. | 370/342 |
| 2003/0095513 A1 * | 5/2003 | Woodmansee et al. | 370/324 |
| 2003/0109256 A1 | 6/2003 | Holcman | |
| 2006/0084439 A1 * | 4/2006 | Joshi et al. | 455/436 |

\* cited by examiner

*Primary Examiner* — Derrick Ferris
*Assistant Examiner* — Matthew Hopkins
(74) *Attorney, Agent, or Firm* — Oblon, Spivak, McClelland, Maier & Neustadt, L.L.P.

(57) ABSTRACT

A method for setting up a radio traffic channel in a 3G-network shared between at least two operators. The network's traffic channel resources are divided into operator specific parts, the parts not sharing any common traffic channels. User equipment is allocated channel resources in accordance with it's associated operator, according to a coarse level allocation control, which may be overridden in case no idle traffic channels are available. The allocated traffic channel is preferably associated with the user equipment operator and is furthermore idle in as a large area as possible and/or exhibits an optimum QoS, thereby maximizing network capacity and throughput by minimizing the probability of inter-frequency handover signalling and compressed mode operations. A radio network controller includes installed software, which carries out the traffic channel allocation and control.

15 Claims, 3 Drawing Sheets

RESOURCE ALLOCATION AND NETWORK SHARING BETWEEN A MULTIPLE OF 3G-SERVICE PROVIDERS

TECHNICAL FIELD

The present invention relates generally to cellular radio networks and more specifically to resource allocation and network sharing between a multiple of 3G-service providers, referred to as network operators.

BACKGROUND

Third generation radio cellular networks, here refereed to as 3G-networks, are emerging on the market. The 3G-networks provide a multitude of services, especially high bit rate services and multimedia. A general strive when designing a 3G-network is to maximise it's capacity and data, throughput.

The CDMA-access scheme has been proposed to realise these 3G-networks, e.g. W-CDMA in the USA and CDMA-2000 in Europe.

The handover is a process by which the radio access network changes the radio transmitters, radio access modes, or radio systems that are used to provide the bearer services to the UE (User Equipment), while maintaining a defined RAB (Radio Access Bearer).

Handovers from one cell to another are required in several situations. The most common situation is when the UE moves from one base station coverage area to another. The UE may move between stations within the same radio system or into another system. The 3GPP standards support handovers between UTRA-FDD and GSM or time division duplex (TDD) network frequency bands that meet the specifications.

The multi-standard UE may change its frequency or radio access mode, during a handover to a different cell. The UE may need a handover if it's requested service level exceeds the current cell capacity. If a target cell cannot support the combination of bearer services (voice, data, multimedia, etc) that are provided by the current serving cell, some, or all, of the bearer services may be handed over to another cell.

Within the W-CDMA system, handovers are "soft" in order to maintain link reliability and to allow the use of identical carrier frequencies (intra-frequency handovers). In a soft handover, the UE transmits and receives the same signal from both cells simultaneously to make the transition as seamless as possible. Handovers are more complex when a multi-standard UE moves between cells with different carrier frequencies or to a different network, such as GSM (different carrier frequencies). Both types of handover are managed with an assist from the UE mobile unit.

The multi-standard UE continuously monitors for the presence of cells with other frequencies and radio access systems that it supports. When the network senses the need for a handover, Node B measures some system parameters and commands the UE to measure other parameters and report the results. Key parameters include carrier frequency, system type, traffic volume and QoS levels. When a handover is needed, the NODE B directs the UE to operate in a compressed mode. FIG. 1 illustrates an example of compressed mode transmission. The compressed mode is a method of turning off transmissions for a portion of the 10-ms frame to create gaps that allow time for the UE and NODE B to make a prescribed set of measurements, this gap is illustrated by time period C in FIG. 1. Compressed-mode operation can be achieved by decreasing the spreading factor, removing bits from the data ("puncturing"), or using higher level scheduling to allocate fewer timeslots for user traffic. In compressed frames, the transmission gap slots are not used for data transmission and the instantaneous transmit power is increased in those slots to maintain quality (BER, FER, etc.) during the periods of reduced processing gain, illustrated by time period B in FIG. 1. The normal 10-ms transmission frame is illustrated by time period A in FIG. 1. The value of power increment during period B depends on the transmission time reduction method. Thus, as a consequence, the traffic data throughput for the UE is affected negatively when operating in the compressed mode. Since the capacity of a CDMA-network is interference-limited, the increased transmission power in compressed mode reduces the network capacity. Also, the signalling which the compressed mode requires between the UE and the NODE B steals network capacity.

SUMMARY OF THE INVENTION

It is an object of the present invention to provide a method and means that solves or alleviates the problems/drawbacks of inter-frequency handovers and the compressed mode operation discussed above and which are capable of increasing the capacity of a cellular radio network, comprising at least one 3G-access node. It is to be understood that a 3G-access node is any radio access node offering high bit-rate data packet or multimedia services at least according to the 3G-standard, i.e. normally at least 144 Kb/s, preferably at least 384 Kb/s. The phrase "high bit rate traffic channel resources" means here any CDMA traffic channel resources meeting the 3G-standard bit rates or higher bit rates.

Another object is to increase the overall data throughput in a cellular radio network, comprising at least one 3G-access node.

The invention provides a method for setting up a radio traffic channel in a 3G-network shared between at least two operators, A and B. The network's traffic channel resources are divided into at operator specific parts, said parts not sharing any common traffic channels. User equipment, UE, is allocated channel resources in accordance with it's associated operator, according to a coarse level allocation control, which may be overridden in case no such idle traffic channels are available. The allocated traffic channel is preferably associated with the UE's operator and is furthermore idle in as a large area as possible and/or exhibits an optimum QoS, thereby maximising network capacity and throughput by minimising the probability of inter-frequency handover signalling and compressed mode operations. The Radio Network Controller, RNC, has installed software, which carry out the traffic channel allocation and control according to the invention.

According to a first aspect, the invention achieves these goals by providing a method for setting up a radio traffic channel exploiting the CDMA-access scheme in a cellular radio network, said network shared between at least two operators, A and B, offering high bit rate services, meeting at least the 3G-standard, to at least one User Equipment, UE, through at least one 3G-access node in a first cell, cell 1, comprising a Radio Network Controller, RNC, connected with a Base Station, BS, (214), wherein said method comprises the following steps:

a) dividing the total of the high bit rate traffic channel resources of said network into at least two operator specific parts, part 1 and part 2, said parts 1 and 2 not sharing any common traffic channels, b) specifically associating said operator A with said part 1 and operator B with said part 2, c) initiating said UE in said cell 1, d) associating said UE with said operator A, e) detecting a call set-up request for said UE, f) identifying an idle traffic channel, in form of a frequency, F1, in combination with a spreading code, C1, by searching among the traffic channel resources of said part 1, g) allocating said identified idle traffic channel, F1, C1, to said UE, and, h) setting up a radio traffic channel between said UE and said BS by exploiting said allocated traffic channel resource, F1 and C1.

In one embodiment, said step f) of identifying an idle traffic channel comprises the following step:

identifying the idle traffic channel as being the traffic channel among said part 1 resources which is idle in a defined cluster of cells comprising at least said cell 1.

In one embodiment, said step f) of identifying an idle traffic channel comprises the following step:

defining said cluster of cells so that it comprises as many cells as possible sharing a common idle traffic channel, defined by the same frequency F1 and the same spreading code C1 in all of said cluster cells.

In another embodiment, said step f) of identifying an idle traffic channel comprises the following step:

identifying the idle-traffic channel as being the idle traffic channel, among said part 1 resources in said cell 1, defined by an idle spreading code together with the traffic channel frequency showing the highest overall QoS in said cell 1.

In one embodiment, the method according to the invention further comprises the steps of:

monitoring the QoS of said radio traffic channel between UE and BS in said cell 1, and, detecting that said QoS is below a given threshold value for said traffic channel, identifying a second UE in said cell 1 associated with said operator B and which UE exploits the same traffic channel frequency, F1, as said UE and, identifying an idle traffic channel on a second frequency F2 among said part 2 resources associated with said operator B, and, carrying out an inter-frequency handover for said second UE to said identified idle channel on said second frequency F2 associated with said operator B.

In one embodiment, the method according to the invention comprises the steps of:

establishing a hand-over request for said UE in said cell 1, to a neighbouring cell, cell 2, identifying a second idle traffic channel defined by the identical frequency, F1, together with the identical spreading code C1, in cell 2, carrying out a hand-over for said UE to said second cell by exploiting said identified second idle traffic channel in cell 2, without using an inter-frequency handover procedure.

In another embodiment, the method of the invention comprises the step of:

searching among the traffic channel resources of said part 2 in order to identify an idle traffic channel for allocation to said UE in case no idle traffic channel is found among said channel resources of part 1.

In one embodiment, said step b) of specifically associating said operator A with said part 1 and operator B with said part 2 comprises the step of:

storing information defining said parts 1 and 2 together with information linking said part 1 to said operator A and said part 2 with said operator B in a storage means in said RNC.

According to a second aspect, the invention provides a Radio Network Controller, RNC, for setting up a radio traffic channel for at least one User Equipment, UE, in a cellular radio network exploiting the CDMA-access scheme, said network being shared between at least two operators, A and B, offering high bit rate services meeting at least the 3G-standard, said UE communicating with said RNC at least via up/down-link control channel/s, wherein said RNC has access to storage means having a first entry with stored information defining a first part of said network's high bit rate traffic channels, part 1, associated and linked with said operator A, and at least a second entry with stored information defining a second part of said network's high bit rate traffic channels, part 2, associated and linked with said operator B, wherein said parts 1 and 2 do not share any common traffic channels.

In one embodiment, the Radio Network Controller, RNC, has processing means with installed software code means which, when loaded in said processing means, makes said processing means execute a procedure realising the following steps:

a)—associating said UE with said operator A, b)—detecting a call set-up request for said UE, c)—fetching, from said storage means' first entry said part 1 of traffic channels associated with said operator A, d)—identifying an idle traffic channel, in form of a frequency, F1, and a spreading code, C1, by searching among the traffic channels of said part 1, e)—allocating said identified traffic channel to said UE, f)—setting up a radio traffic channel between said UE and a base station, BS, connected with said RNC, by exploiting said allocated traffic channel, F1 and C1.

In one embodiment, said storage means is integrated with said RNC.

In one embodiment, the RNC's processing means has said installed software code means which, when said software code means is loaded in said processing means, carry out a procedure realising the following step:

identifying the idle traffic channel in said step d) as being the idle traffic channel among said part 1 resources which is idle in a defined cluster of cells comprising at least said cell 1.

In one embodiment, said installed software code means, when said software code means is loaded in said processing means, carry out a procedure realising the following step:

defining said cluster of cells so that it comprises as many cells as possible sharing a common idle traffic channel.

In another embodiment, said installed software code means, when said software code means is loaded in said processing means, carry out a procedure realising the following step:

identifying the idle traffic channel in said step d) as being the idle traffic channel, among said part 1 resources in said cell 1, defined by an idle spreading code together with the traffic channel frequency showing the highest overall QoS in said cell 1.

In one embodiment, said installed software code means, when loaded in said processing means, carry out a procedure realising the following steps:

monitoring the QoS of said radio traffic channel between UE and BS in said cell 1, and, detecting that said QoS is below a given threshold value for said traffic channel, identifying a second UE in said cell 1 associated with said operator B and which UE exploits the same traffic channel frequency, F1, as said UE and, identifying an idle traffic channel on a second frequency F2 among said part 2 resources associated with said operator B, and, carrying out an inter-frequency handover for said second UE to said identified idle channel on said second frequency F2 associated with operator B.

In one embodiment, said installed software code means, when loaded in said processing means, carry out a procedure realising the following steps:

establishing a hand-over request for said UE in said cell 1, to a neighbouring cell, cell 2, identifying a second idle traffic channel defined by the identical frequency, F1, together with the identical spreading code C1, in cell 2, carrying out a hand-over for said UE to said second cell by exploiting said identified second idle traffic channel in cell 2, without using an inter-frequency handover procedure.

In one embodiment, said installed software code means, when loaded in said processing means, carry out a procedure realising the following step:

searching among the traffic channel resources of said part 2 in case no idle traffic channel is found among said channel resources of part 1, during said step d) of identifying an idle traffic channel.

According to a third aspect, the invention provides a computer program product comprising a computer readable medium, having thereon:

computer program code means which, when loaded in said RNC's processing means, realises the RNC according to the invention.

Even though the invention has been summarised above, the invention is defined by the appended claims.

Further objects and advantages will become apparent when reading the following description together with the accompanying drawings.

DETAILED DESCRIPTION

The invention shall now be described in more detail with reference to the accompanying drawings.

Figure 1:
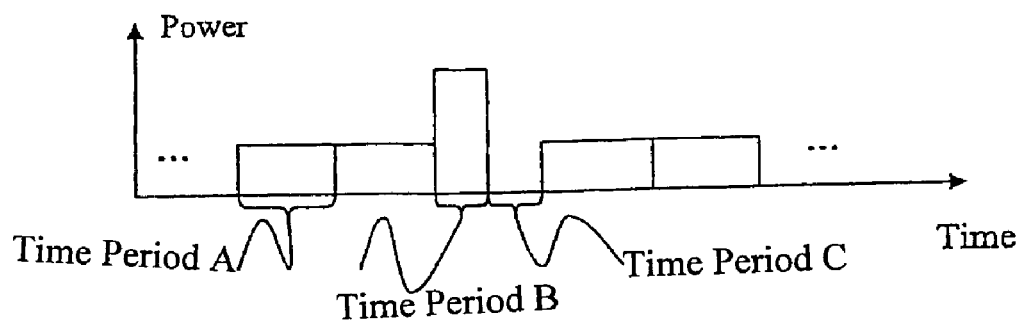
FIG. 1 is an illustrative example of compressed mode transmission in a WCDMA cellular network.
Figure 2:
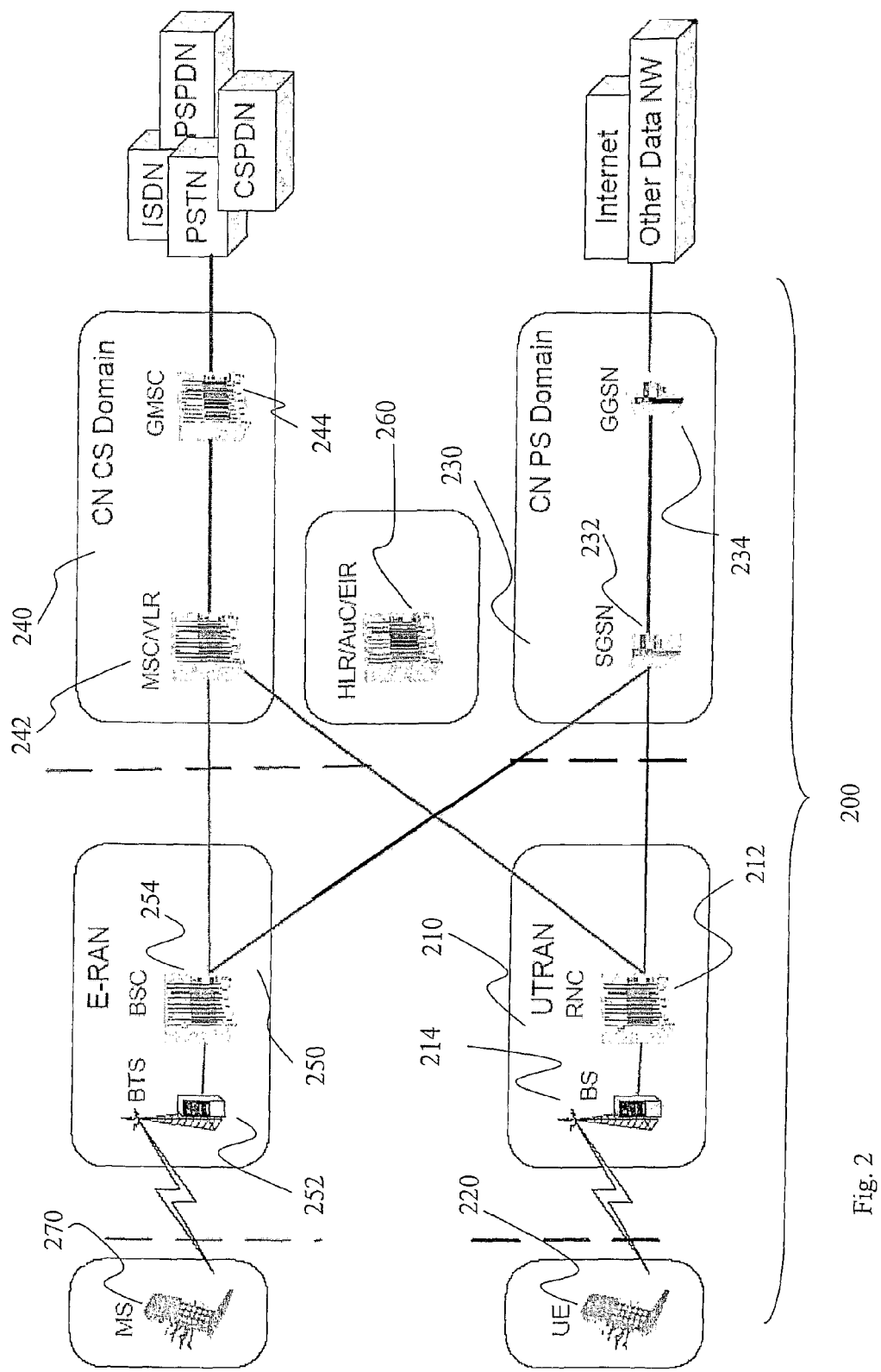
FIG. 2 illustrates a cellular radio network, in which the invention can be applied.

FIG. 2 illustrates the architecture of a cellular radio network 200 in which the invention can be applied. The network comprises at least one radio access node 210 providing 3G-IMT-2000 (International Telecommunications Network) bearer services, i.e. 3.rd generation services such as multimedia, high-bit rate packet data etc, to at least one UE (User Equipment) 220. In Europe, UMTS-networks (Universal Mobile Telecommunication System) using the WCDMA (Wideband Code Division Multiple Access) access scheme have been proposed to realise the 3G-IMT-2000 networks, and in the United states the CDMA-2000 access scheme has been proposed. The access node 210 is connected with a BS (Base Station) and at least one CN (Core Network). The CN may be PS (Packet Switched), illustrated by CN 230 in FIG. 1, connected via a GGSN (Gateway General packet radio services Support Node), 234, to other data networks, e.g. the Internet, or it can be CS (Circuit Switched), illustrated by CN 240, connected via a GMSC (Gateway Mobile Switching Center), 244, with networks such as a PSTN (Public Switched Telecommunications Network), an ISDN (Integrated Services Data Network), a PSDN (Packet Switched Data Network) and a CSPDN (Circuit Switched Data Network). In case of an UMTS network, the access node is a UTRAN— (UMTS Terrestrial Radio Access Network) access node, comprising a RNC (Radio Network Controller), 212, connected with a SGSN (Serving General packet radio services Support Node), 232, a MSC/VLR (Mobile Switching Centre/Visiting Location Register), 242, and a BS (Base Station) 214. FIG. 2 illustrates an access node 250 according to a second generation cellular radio network, in this case an E-RAN (Edge-Radio Access Node), i.e. a 2G+ radio access node, comprising a BTS (Base Transceiver Station) 252 and a Base Station Controller (BSC) 254. The MSC 242 is normally connected with a HLR (Home Location Register), 260. The MS (Mobile Station) 270 can establish a radio link connection with BTS (Base Transceiver Station) 252 to obtain 2G+-services (i.e. speech and GPRS-traffic). The UE 220 can establish a radio link connection with BS (Base Station) 214 to obtain 3G-services (e.g. multimedia, high bit rate and IP 'Internet Protocol'-traffic) and with BTS (Base Transceiver Station) 252 to obtain 2G+-services. Normally, a cellular network comprises a multitude of radio access nodes, each node forming a cell or sector/s, but FIG. 2 only illustrates two access nodes, 210 and 250. In FIG. 2, the cell served by BS 214 is referred to as cell 1.

The present invention is applicable when at least two operators, A and B, share a common 3G-cellular network, such as an UTRAN-network illustrated in FIG. 2.

Figure 3:
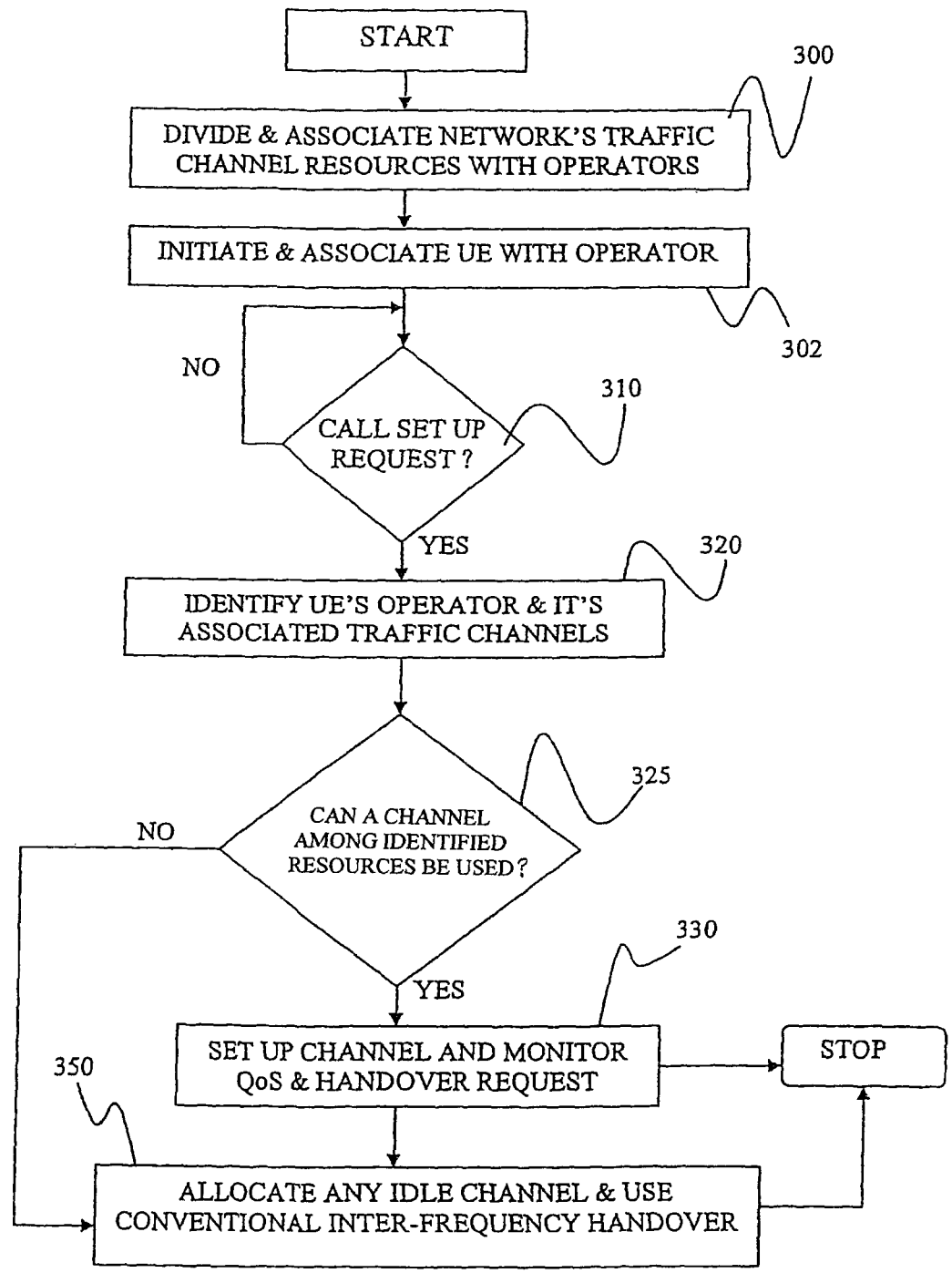
FIG. 3 is a flowchart diagram of the algorithm according to the invention.

The method of the present invention is normally realised by means of a software program installed in the processing means of at least one RNC of the 3-G-network, such as the processing means of RNC 212, not illustrated in FIG. 2. RNC 212 has access to a computer readable storage means, preferably integrated with said RNC. Preferably, all RNC:s in the network have corresponding storage means and the computer software according to the invention installed in corresponding processing means. This software, together with a conventional UE (220) camping in cell 1, realises the algorithm illustrated in FIG. 3, now to be described. As an illustrative example, the algorithm shall be described for the case of an UTRAN-3G-network wherein operator A serves the UE 220.

In step 300, the RNC 212, i.e. the processing means of RNC 212, creates a list of specific traffic channel resources associated with each and all of the operators sharing the common UTRAN-network, illustrated by table 1 below for the case of two operators A and B sharing the same UTRAN-network. Table 1 illustrates 4 different cases; the network is not divided in case 1 illustrating the prior art, divided in parts 1 and 2 in case 2, divided in parts 1, 2 and 3 in case 3 and divided in 4 different parts in case 4, however these cases are only illustrative examples. The list is normally stored in a computer memory in RNC 212. Step 300 is performed at network installation and the list is updated accordingly whenever the network is reconfigured, i.e. the channel resources are changed in some way. The specific traffic channel resources consist of a combination of spreading codes and carrier frequencies defining specific traffic channels, in a conventional manner according to e.g. the UMTS-WCDMA channel definition scheme. Thus, in table 1, part 1 may be defined by one frequency, F1, together with a set of spreading codes, part 2 may be defined by a second frequency F2 together with a set of spreading codes and part 3 may be defined by a third frequency F3 together with a set of spreading codes. Thus, in step 300, the network's total 3G-traffic channel resources are divided into different operator specific parts. The size of the different channel resource parts is normally established according to the number of subscribers for the different operators. For instance, assume that operator A and B have substantially the same amount of subscribers, then a suitable network sharing according to the invention is to allocate the resources e.g. according to case 2, in table 1, where the number of traffic channels of part 1 equals the number of traffic channels of part 2. Similarly, if operator A has about double as many subscribers as operator B, parts 1, 2 and 3 are designed to have substantially the same number of traffic channels and the division is e.g. carried out according to case 3 in table 1. However, the different parts need not have the same number of traffic channels, it is a commercial decision and many possibilities exist. According to the invention, the division is made so that no channel resources overlap between different operators, i.e. a given traffic channel is associated with one operator only. The algorithm then proceeds to step 302.

TABLE 1

| All traffic channel resources in the common 3G-network | Traffic channel resources allocated to operator A | Traffic channel resources allocated to operator B |
| --- | --- | --- |
| Part 1; Network not divided (case 1) | Part 1; Shared with B | Part 1; shared with A |
| Part 1 and 2 (case 2) | Part 1 | Part 2 |
| Part 1, 2 and 3 (case 3) | Part 1 and 3 | Part 2 |
| Part 1, 2, 3 and 4 (case 4) | Part 1 and 3 | Part 2 and 4 |

In step 302, the UE, is initiated in a conventional manner, i.e. it is turned on and performs a cell search by synchronising with the (strongest) BS 214 and identifies itself, e.g. by transmitting it's IMSI-code to the BS 214 and then continuously listens to the BS's 214 downlink pilot/control-channel/s. The IMSI—(International Mobile Subscriber Identity) code is stored on the USIM—(Umts Subscriber Identity Module) card installed in UE 220 and consists of a 3-digit Mobile Country Code (MCC), a 2-3 digit MNC (Mobile Network Code) and the MSIN (Mobile Subscriber Identification Number). The IMSI-code unambiguously identifies the operator providing the UE 220 with services and has normally a maximum of 15 digits. The RNC obtains said IMSI-code from BS 214 and stores it in a dedicated memory comprising the IMSI-codes of all UE:s currently roaming in the cell/sector of BS 114 and translates said stored IMSI-code to a specific operator code, e.g. by using a pre-installed look-up table. Thus, the RNC 212 associates the UE 220 with the UE's operator in step 302. Alternatively, the RNC 212 may associate the UE with it's operator by the following procedure:
1. after synchronising with the BS 214, the UE 220 obtains the network's common PLMN (Public Land Mobile Network) code by listening on a down-link channel in a conventional manner,
2. the UE 220 then translates the PLMN-code to an operator specific PLMN-operator code identifying a specific operator in accordance with information stored in said UE 220, preferably on a USIM card installed in said UE 220, said PLMN-operator code here referred to as PLMNA for operator A,
3. the UE 220 thereafter sends said PLMN-operator code to the RNC 212 via conventional up-link transmission to the BS 214, i.e. sends said PLMNA-code in case of an installed USIM-card associated with operator A.

Alternatively, the UE 220 is initiated by roaming in to cell 1 from another cell not served by RNC 212. In this case, the RNC 212 normally associates the UE 220 with it's operator by communicating with the RNC previously serving the UE 220. The algorithm then proceeds to step 310.

In step 310, the RNC 212 continuously listens for a call set-up request, either in form of a call request from the UE 220 on the up-link RACCH (Random Access Control Channel) in case of an outgoing call from said UE 220, or a call set-up request from the network's conventional call set-up function, possibly from another RNC in the network or MSC 142 or SGSN 132, in case of an incoming call to said UE 220. As soon as RNC 212 detects a call set-up request, the algorithm proceeds to step 320.

In step 320, the RNC 212 fetches traffic channel resources associated with the UE's 220 operator from said stored list, e.g. according to above table 1. For instance, assume that the RNC has associated the UE 220 with operator A, in step 302 and that the 3G-network in step 300 is divided in three parts 1, 2 and 3, according to case 3 in above table 1, then the RNC 212 fetches the traffic channel resource parts 1 and 3, in step 320, from said table 1. According to our illustrative example, part 1 and 3 comprise two frequencies F1 and F3, each with a respective set of spreading codes, C-set 1, C-set 2. The algorithm then continues to step 325.

In step 325 the RNC 212 search for a suitable traffic channel to be allocated to said UE 220, camping in said cell 1, by identifying at least one idle traffic channel among said traffic channel/s fetched in step 320, e.g. searching among part 1 and 3 according to our illustrative example. The subset of idle candidate traffic channels for allocation to the UE 220 is identified by communicating with higher network functions i.e. the channel allocation function. If no idle traffic channel candidate can be identified, i.e. all traffic channels associated with the UE's 220 operator are busy or can not meet the requested service level, the algorithm proceeds to step 350, according to one embodiment. In another embodiment, the call set up request is rejected and the algorithm stops. If at least one idle candidate traffic channel is identified, then, according to one embodiment, the algorithm selects the first of said at least one idle traffic channels and proceeds directly to step 330 wherein a conventional call set-up is carried out. According to another embodiment, the RNC investigates if said identified at least one idle traffic channel can be used for call set-up and/or selects the best candidate idle traffic channel to minimise interference in the cell, and then proceeds to step 330.

Thus, in one embodiment the RNC selects the idle traffic channel giving an expected overall optimised QoS (Quality of Service, e.g. in form of an optimised SNR, FER or BER) in the cell, e.g. by selecting an idle traffic channel, the frequency of which has the highest overall SIR in the cell, and then proceeds to step 330. In another embodiment, the algorithm proceeds to step 350 if the overall load conditions in the cell don't allow for an extra idle channel to be allocated, according to a suitable criterion, such as that all frequencies, among the identified idle traffic channel frequencies, have a SIR-value below a given threshold value, i.e. the weighted average SIR-values for all channels of the individual frequencies is below a given threshold value, for all frequencies.

Thus, according to one embodiment, said step of identifying an idle traffic channel comprises the following step:
identifying the idle traffic channel as being the traffic channel among said resources associated with the UE 220, i.e. part 1 and 3 in our illustrative example, which is idle in a defined cluster of cells comprising at least said cell 1. The cluster definition is normally made in accordance with statistical data regarding the number of handovers from said cell 1 to other cells in order to find a reasonably big area in which the UE (220) can roam with a good probability of not needing to carry out an inter-frequency handover.

In one embodiment, said cluster is defined so that it comprises as many cells as possible sharing a common idle traffic channel, defined by the same frequency F1 and the same spreading code C1 in all of said cluster cells. This is an effective way of reducing the probability of inter-frequency handovers when roaming in said defined cluster.

This step can be realised by e.g. making a list of all idle traffic channels in cell 1 and then combining, e.g. by logical AND, said list with corresponding lists of all idle traffic channels in the neighbouring cells, and the combine the result with corresponding lists of idle traffic channels in all cells being neighbours to said neighbouring cells and so on until only one idle traffic channel remains, but other possibilities exist, obvious for a person skilled in the art. In another embodiment said step of identifying an idle traffic channel comprises the following step:

identifying the idle traffic channel as being the idle traffic channel, among said part 1 and 3 resources in said cell 1, defined by an idle spreading code together with the traffic channel frequency showing the highest overall SNR in said cell 1. Thus, the RNC scans all the frequencies having at least one idle channel, i.e. spreading code, among said parts 1 and 3, and forms an overall SNR estimate, e.g. in form of a mean or median value of all the individual channels on the individual frequencies. Alternatively, other QoS estimates can be used, such as BER, FER etc.

In one embodiment, the said step of identifying an idle traffic channel comprises the following step:

searching among the traffic channel resources associated with an operator not being the UE's (220) operator, in case no idle traffic channel is found among said channel resources of part 1. For instance, according to our example with the UE associated with operator A, then the algorithm would continue to search for idle channels in part 2 associated with operator B in case no idle traffic channel could be identified in said part 1. According to the invention, the algorithm stops and the call set up is rejected in a conventional manner if no traffic channel is idle among all of the network's traffic channels in the cell where the UE (220) camps, i.e. cell 1 in our example.

The identified traffic channel is then selected for allocation to said UE (220), and the algorithm proceeds to step 330.

In step 330, the UE 220 is allocated said traffic channel selected in step 325, e.g. defined by frequency F1 and spreading code C1 in our illustrative example, and a radio traffic channel between UE 220 and BS 214 is set up in a conventional manner. The RNC thereafter continuously monitors the QoS (in the up-link) and the possible need for a hand-off to another base station for said UE 220. If the QoS falls below a pre-established threshold value, or if a hand-over is required to a neighbouring cell having no idle traffic channels, e.g. no idle spreading codes on the UE's currently allocated frequency, F1, in our illustrative example, then the algorithm proceeds to step 350, according to one embodiment.

In a preferred embodiment, however, the algorithm performs the following steps in case that the UE's 220 QoS in the uplink is detected to be below a given threshold value:

identifying a second UE (not shown in FIG. 2) in said cell 1 associated with an operator not being the UE's 220 operator, i.e. a UE-associated with operator B in our illustrative example, which second UE exploits the same traffic channel frequency, F1, as said UE (220) and, identifying an idle traffic channel on a second frequency F2 among the traffic channel resources associated with said second UE's operator, i.e. said part 2 resources associated with said operator B according to our illustrative example, and, carrying out an inter-frequency handover for said second UE to said identified idle traffic channel associated with said second UE's operator, i.e. to said second frequency F2 associated with said operator B, in our illustrative example.

If a hand-over is required, established in a conventional manner, and there are traffic channel resources available on the same frequency, F1, also in the target cell, then the RNC carry out a conventional hand-over exploiting these traffic channel resources without using a frequency hand-over or compressed mode operations of UE 220. Thus, the algorithm carry out the following steps:

establishing a hand-over request for said UE (220) in said cell 1, to a neighbouring cell, cell 2, identifying a second idle traffic channel defined by the identical frequency, F1, together with the identical spreading code C1, in cell 2, carrying out a hand-over for said UE (220) to said second cell by exploiting said identified second idle traffic channel in cell 2, without using an inter-frequency handover procedure.

The RNC 212 continues to monitor the traffic channel allocated to UE 220 until the call is terminated, or until a full hand-over has been completed to another RNC in the network. The new target RNC then takes over the task of RNC 212, as described below. Whenever an inter-cell handover has been completed from a previous cell to a target cell, the RNC 212 sets the UE's 220 allocated traffic channel to idle in the previous cell and to busy in the target cell in a conventional manner by communicating with the channel allocation functions in the network. In case of a full hand-over, i.e. fully completed, to the same frequency F1 in a neighbouring cell, the algorithm continues to apply also in this cell and possibly further hand-over cells for which no inter-frequency handovers have taken place until the call is terminated. In case of roaming to a cell served by another RNC, not illustrated in FIG. 2, the RNC 212 communicates with the new serving RNC which takes over the task of realising the algorithm according to the invention in the new cell. If the new RNC does not have the software according to the invention installed, then the algorithm proceeds to step 350, wherein conventional inter-frequency handovers will be applied by this new RNC in a conventional manner. The algorithm stops when the call is terminated. Thus, in step 330 the conventional compressed mode procedures and inter-frequency handovers are overridden, and as a consequence, no compressed mode operations or inter-frequency handovers are carried out for UE 220 in step 330.

In step 350, the RNC allocates the UE 220, associated with operator A in our illustrative example, any of the networks idle traffic channel resources associated with another operator, e.g. B in our example, and the traffic channel for UE 220 is set up in a conventional manner. The RNC then applies the conventional inter-frequency handover procedure for said traffic channel, i.e. instructing the UE to enter compressed mode operation in case of a shortage of traffic channel resources on the current frequency, i.e. the QoS falls below a given threshold value, or in case a hand-over is required to a another cell lacking traffic channel resources on the frequency which the UE 220 currently exploits in it's current cell. When a full hand-over has been completed, the RNC 212 updates the UE's 220 allocated traffic channel to idle in the previous cell and to busy in a conventional manner, by communicating with the channel allocation function in the network. The algorithm stops when the call is terminated.

By dividing the networks resources among the different operators and allocate traffic channel resources in the way described above according to the invention, the probability of inter-frequency handovers and compressed mode operations in the network is drastically decreased and, as a direct consequence, also the network signalling decreases, which directly translates into an increased network capacity.

Also, the decreased number of compressed mode operations for the UE 220 translates into a better data throughput for the UE 220.

It is to be understood that the above description is only an illustrative example and that many modifications are possible. Therefore, the scope of the invention is defined only by the following claims.

The invention claimed is:

1. A method for setting up a radio traffic channel exploiting CDMA-access scheme in a cellular radio network, the network shared between at least first and second network providers offering high bit rate services to at least one user equipment through at least one node in a first cell, including a radio network controller (RNC) connected with a base station, the method comprising:

dividing a total of high bit rate traffic channel resources of the network into at least first and second network provider specific parts, the first and second parts not sharing any common traffic channels, and each part representing an allocation of traffic channel resources to the respective network provider;

associating the first network provider with the first part and the second network provider with the second part;

associating the user equipment initiated in a first cell with the first network provider;

detecting a call set-up request for the user equipment;

identifying an unused traffic channel in a form of a frequency in combination with a spreading code, by searching among the traffic channel resources of the first part, and in response to reduced availability of the traffic channel resources of the first part, by searching among the traffic channel resources of the second part that provides an idle traffic channel resource on a second frequency associated with the second network provider, said second frequency being exploitable by the first network provider;

allocating the identified idle unused traffic channel, having the frequency and the spreading code, to the user equipment; and setting up a radio traffic channel between the user equipment and the base station by exploiting the allocated traffic channel resource, including the frequency and the spreading code.

2. The method of claim 1, wherein the identifying an unused traffic channel further comprises:

identifying the unused traffic channel from among the first part resources by identifying a traffic channel which is idle in a cluster of cells comprising at least the first cell.

3. The method of claim 2, wherein the identifying an unused traffic channel further comprises:

defining the cluster of cells to comprise as many cells as possible sharing a common idle traffic channel, defined by the same frequency and the same spreading code in all of the cluster cells.

4. The method according to claim 2, further comprising:

monitoring the QoS of the radio traffic channel between the user equipment and base station in the first cell;

detecting that the QoS is below a given threshold value for the radio traffic channel;

identifying a second user equipment in the first cell associated with the second network provider and which exploits the same traffic channel frequency as the user equipment;

identifying a second traffic channel, on a different frequency, from among the second part resources associated with the second network provider; and carrying out an inter-frequency handover for the second user equipment to the identified unused second traffic channel on the different frequency associated with the second network provider.

5. The method according to claim 2, further comprising:

establishing a hand-over request for the user equipment in the first cell, to a neighbouring second cell;

identifying a second unused traffic channel having an identical frequency together with an identical spreading code as the radio traffic channel in the second cell; and carrying out a hand-over for the user equipment to the second cell by exploiting the identified second unused traffic channel in the second cell, without using an inter-frequency handover procedure.

6. The method of claim 1, wherein the identifying an unused traffic channel further comprises:

identifying the unused traffic channel from among the first part resources in the first cell, by identifying a traffic channel showing the highest overall QoS in the first cell.

7. The method of claim 1, wherein the associating the first network provider with the first part and the second network provider with the second part further comprises:

storing information defining the first and second parts together with information linking the first part to the first network provider and the second part with the second network provider in a storage in the radio network controller.

8. A radio network controller, for setting up a radio traffic channel for at least one user equipment in a cellular radio network exploiting CDMA-access scheme, the network being shared between at least first and second network providers offering high bit rate services, the user equipment communicating with the radio network controller at least via up/down-link control channel/s, the radio network controller comprising:

a processing unit configured to access a computer readable storage unit having stored therein a first entry with stored information defining a first part of the network's high bit rate traffic channels associated and linked with the first network provider, and at least a second entry with stored information defining a second part of the network's high bit rate traffic channels associated and linked with the second network provider, each part representing an allocation of traffic channel resources to the respective network provider, wherein the first and second parts do not share any common traffic channels, and the processing unit is further configured to associate the user equipment with the first network provider;

detect a call set-up request for the user equipment;

fetch, from the storage unit, the first part of traffic channels associated with the first network provider and the second part of traffic channels associated with the second network provider;

identify an unused traffic channel in a form of a frequency in combination with a spreading code by searching among the traffic channel resources of the first part and in response to reduced availability of the traffic channel resources of the first part, by searching among the traffic channel resources of the second part that provides an idle traffic channel resource on a second frequency associated with the second network provider, said second frequency being exploitable by the first network provider;

allocate the identified unused traffic channel, having the frequency and the spreading code, to the user equipment; and set up a radio traffic channel between the user equipment and the base station by exploiting the allocated traffic channel resource, including the frequency and the spreading code.

9. The radio network controller according to claim 8, wherein the storage unit is integrated with the radio network controller.

10. The radio network controller according to claim 8, wherein the processing unit is further configured to identify the unused traffic channel from among the first part resources by identifying a traffic channel which is idle in a cluster of cells comprising at least a first cell.

11. The radio network controller according to claim 10, wherein the processing unit is further configured to define the cluster of cells to comprise as many cells as possible sharing a common idle traffic channel.

12. The radio network controller according to claim 8, wherein the processing unit is further configured to identify the unused traffic channel from among the first part resources in the first cell, by identifying a traffic channel showing the highest overall QoS in the first cell.

13. The radio network controller according to claim 8, wherein the processing unit is further configured to monitor a QoS of the radio traffic channel between the user equipment and the base station in the first cell, detect that the QoS is below a given threshold value for the radio traffic channel, identify a second user equipment in the first cell associated with the second network provider and which exploits the same traffic channel frequency as the user equipment, identify a second traffic channel, on a different frequency, from among the second part resources associated with the second network provider, carry out an inter-frequency handover for the second user equipment to the identified unused second traffic channel on the different frequency associated with the second network provider.

14. The radio network controller according to claim 8, wherein the processing unit is further configured to establish a hand-over request for the user equipment in the first cell, to a neighbouring second cell, identify a second unused traffic channel having an identical frequency together with an identical spreading code as the radio traffic channel in the second cell, carry out a hand-over for the user equipment to the second cell by exploiting the identified second unused traffic channel in the second cell, without using an inter-frequency handover procedure.

15. A non-transitory computer readable medium having stored therein a computer program that when executed by a computer causes the computer to execute a method for setting up a radio traffic channel exploiting CDMA-access scheme in a cellular radio network, the network shared between at least first and second network providers offering high bit rate services to at least one user equipment through at least one node in a first cell, including a radio network controller (RNC) connected with a base station, the method comprising:

dividing a total of high bit rate traffic channel resources of the network into at least first and second network provider specific parts, the first and second parts not sharing any common traffic channels, and each part representing an allocation of traffic channel resources to the respective network provider;

associating the first network provider with the first part and the second network provider with the second part;

associating the user equipment initiated in a first cell with the first network provider;

detecting a call set-up request for the user equipment;

identifying an unused traffic channel in a form of a frequency in combination with a spreading code, by searching among the traffic channel resources of the first part, and in response to reduced availability of the traffic channel resources of the first part, by searching among the traffic channel resources of the second part that provides an idle traffic channel resource on a second frequency associated with the second network provider, said second frequency being exploitable by the first network provider;

allocating the identified unused traffic channel, having the frequency and the spreading code, to the user equipment; and setting up a radio traffic channel between the user equipment and the base station by exploiting the allocated traffic channel resource, including the frequency and the spreading code.

\* \* \* \* \*